Jan. 16, 1934.  E. T. LINDEROTH  1,944,088
MEANS FOR CONTROLLING THE TEMPERATURE OF HOT WATER FOR TAPPING PURPOSES
Filed Nov. 7, 1932
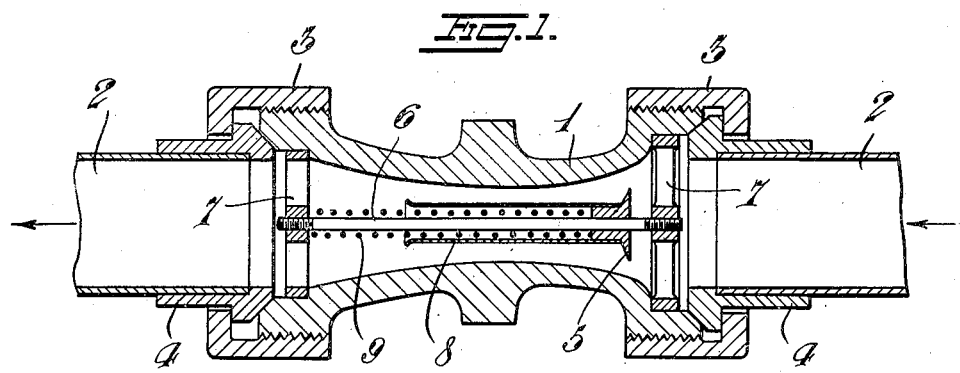
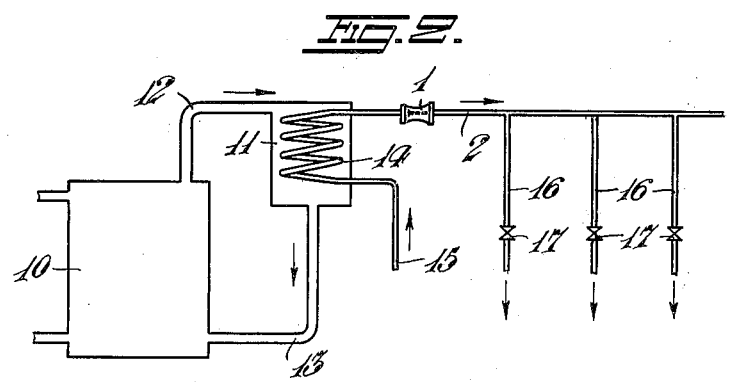
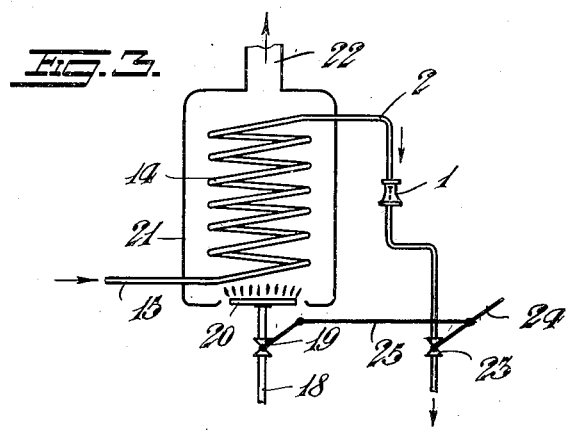
Inventor
Erik T. Linderoth,
By Sommers & Young
Attys.

Patented Jan. 16, 1934

1,944,088

UNITED STATES PATENT OFFICE 1,944,088

MEANS FOR CONTROLLING THE TEMPERATURE OF HOT WATER FOR TAPPING PURPOSES

Erik Torvald Linderoth, Sodertalje, Sweden, assignor to Curt Fredrik Rosenblad, Sodertalje, Sweden Application November 7, 1932, Serial No. 641,679, and in Sweden November 2, 1931

6 Claims. (Cl. 122—4)

This invention refers to hot water systems for tapping purposes, for instance, such systems as are used for supplying hot water to bath rooms, kitchens and the like in dwelling houses. For such purposes it is common practice to use either a central hot water heater common to several tapping places or stations, for instance, common to all tapping places in a house, or on individual hot water heater for each tapping place. In both cases apparatus are generally used in which the tap-water is heated only if tapping actually takes place, i. e. if there is a flow in the tapping system. Thus, the hot water is not continuously heated and accumulated for tapping, for obvious reasons. Such apparatus operated intermittently are very economical and save heat, i. e. fuel, but suffer from the drawback that the temperature of the hot water will vary with the intensity of tapping, i. e. an excessive tapping causes such rapid flow of water through the heater that the temperature of said water is not raised to a sufficient value. Said inconvenience is particularly heavy in systems having a central heater for several tapping stations, because tapping from several or all the stations may sometimes take place simultaneously and then the temperature of the tap-water will fall to too low values, because it is, from an economic point of view, not suitable to dimension the heater for the maximum tapping possible. On the contrary the capacity of the heater must be chosen with regard to the average quantity tapped.

The chief object of this invention is to overcome such inconvenience and prevent the temperature of the hot water or other liquid tapped from falling below a pre-determined value.

A further purpose of this invention is to limit the maximum tapping quantity per unit of time to such value that the temperature of the hot water cannot fall below a value determined by the actual capacity of the heater.

A further purpose of this invention is to make the control of the temperature of hot water for tapping purposes independent of the pressure in the main supplying water to the tapping system.

A further object of this invention is to effect such control automatically with simple, and cheap, but reliable means resistive to wear and damage.

A further object of this invention is to effect such control with a minimum loss of pressure.

Some embodiments of the invention are illustrated in the annexed drawing.

Fig. 1 shows a vertical central section through a control device in accordance with this invention, on a larger scale.

Fig. 2 shows a tapping system having several tapping stations and provided with a control device in accordance with this invention.

Fig. 3 shows a tapping system having only one tapping station and provided with a control device in accordance with this invention.

Referring now to Fig. 1 of the drawing 1 indicates a housing inserted into the hot water pipe 2 and secured by means of two unions 3 engaging shoulders or sleeves 4 secured on the pipe ends 2. The flow of the water is indicated by arrows. In the housing 1 a throttle disc 5 is slidably journalled on a shaft or spindle 6 extending axially in the bore of the housing 1 and threaded at both ends. Said spindle is at its ends screwed into the central hubs of end pieces 7 secured in the housing 1 to centre the spindle. In the embodiment shown said end pieces 7 have the shape of rings having two arms in the direction of a diameter to carry a central hub with threaded holes for the ends of the spindle 6.

Behind the throttle disc 5, counted in the direction of flow, a sleeve 8 is secured to said disc and encloses partially a helical spring 9 placed on the spindle 6 between the throttle disc 5 and the hub of the left end piece 7 in Fig. 1.

The bore in the housing 1 has in the direction of flow an area of passage which first decreases to a minimum value and then increases to a value substantially equal to that of the area of passage of the pipe 2, as shown.

The device as described acts as follows:

The water flowing through the housing 1 in the direction of the arrows originates a force acting upon the movable throttle disc 5 in the direction of said arrows. Said force is counteracted by the force of the spring 9, when the latter is compressed. The force generated by the current of water on the throttle disc depends upon the difference between the pressures prevailing before and behind the throttle disc and said difference will in each moment determine the position of the disc in the housing. On the other hand, the position of said disc determines the quantity of water flowing through the housing 1 per unit of time. If the cross-sections of the bore of the housing 1 along the path of the disc 5 are properly determined it is possible to have the quantity of water flowing through per unit of time restricted to a pre-determined constant or substantially constant value for all positions of the disc along the spindle 6, i. e. for all differences between the pressures before and after said disc.

Because the left portion of the housing 1 in Fig. 1 is shaped as a diffuser some of the pressure will be recovered thus reducing the loss of pressure to a minimum. Such recovery of pressure has its maximum when the disc 5 occupies its extreme right position in Fig. 1, i. e. when the difference of pressure has a low value.

In Fig. 2, 10 indicates a source of heat, such as a boiler for hot water which is circulated through the tap-water-heater 11 via a supply pipe 12 and a return pipe 13, as indicated by the arrows. In said heater there is a coil 14 surrounded by the circulating water from the boiler 10. To the coil 14 fresh, cold water is supplied from the pipe 15, which may be connected with a water works net or with an individual water tank. The fresh water from the pipe 15 is heated in the coil 14 and flows to the pipe 2 in which a control device 1 of the type shown in detail in Fig. 1 is inserted. From the pipe 2 a number of branch pipes 16 with check or tapping valves or cocks 17 are branched off.

The tap-water will flow through the coil 14 and the regulator 1 only if the valve 17 of the least one of the tapping stations is opened, and in such case the direction of flow is that indicated by the corresponding arrows. Even if several of the tapping cocks 17 are open simultaneously the total flow of tap-water is by the control device 1 restricted to such a maximum value that the temperature of the hot tap-water cannot fall below a pre-determined value, determined, inter alia, by the heating capacity of the heater 11 under operating conditions, i. e. when the boiler 10 is heated sufficiently.

In Fig. 3 a tap-water heater heated with gas is shown. The gas supply pipe 18 is provided with a control and check valve 19 and a burner 20 burning within a casing 21 having an outlet 22 for the gases of combustion. The burner heats a coil 14 having a fresh water supply pipe 15 from a tank or a municipal water distribution net. The water heated in the coil 14 is drawn off through a pipe 2 having a control device 1 of the type shown in Fig. 1. In the pipe 2 there is also a check or tapping valve 23 controlling the outflow of tap-water, for instance, in a bath room or kitchen. The valves 19 and 23 are generally mechanically or electrically connected in such manner that the valve 19 is opened and closed in conjunction with valve 23 which is operated by hand. In the embodiment shown the operating handle 24 of valve 23 is mechanically connected with the handle of valve 19 by means of a rod 25.

The action of this embodiment will be obvious from the preceding description and from the drawing.

It is to be observed that variations in the pressure of the fresh water supplied through pipe 15, i. e. in the pressure of the water distribution net, do not affect the control, i. e. the temperature of the hot water tapped is independent of said pressure.

The sleeve 8 prevents the flowing water from engaging the spring, particularly in the narrowest cross-section, and thus the resistance of the flow is reduced. If desired, a tube may be secured to the left one of the end pieces 7 in Fig. 1 and cooperate telescopically with the tube 8 to protect the entire length of the spring 9.

Evidently, regulators of the type shown in Fig. 1 may be inserted into some or each of the branch pipes 16 in Fig. 2, the regulator in pipe 2 being then, by preference, omitted. In such case the individual regulators in pipes 15 may be dimensioned for different quantities passed per unit of time, if desired.

It is evident that the quantity of hot water passing through the housing 1 per unit of time may be altered by substituting, for the spring 9, a new spring having other characteristics.

The suitable shape of the inner surface of the housing 1 may be determined by calculations or experimentally. The cross-section of the passage in the housing 1 may be circular.

What I claim is:

1. In a system for supplying hot water for tapping purposes, in combination, a hot water heater, conduits from said heater to one or more tapping stations, a housing in each of said conduits from said heater, a spindle in said housing, a throttle disc on said spindle, and a spring acting upon said disc, said housing having a cross-sectional area of passage varying along the path of said disc on said spindle so as to give a substantially constant quantity of water passed per unit of time, independent of variations of the pressure in the conduit before and behind said housing.

2. In a hot water plant for tapping purposes, in combination, a hot water heater, at least one conduit from said heater to one or more tapping places, a housing in said conduit, a longitudinal spindle secured in said housing, a throttle disc movable on said spindle in the longitudinal direction, a spring encircling said spindle and acting upon said disc, and a diffuser in said housing behind said disc counted in the direction of flow, said housing having at the path of motion of said disc an area of passage tapering in the direction of flow, so as to give a substantially constant quantity of water passing per unit of time substantially independent of variations in the pressure.

3. In a system for supplying hot water for tapping purposes, in combination, a hot water heater, conduits from said heater to one or more tapping stations, a housing in each of said conduits from said heater, a spindle in said housing, a throttle disc on said spindle, a spring between said disc and a fixed shoulder in said housing, and a sleeve surrounding at least a part of said spring, said housing having an inner surface of such shape as to give, in cooperation with said disc, a substantially constant flow of water therethrough independent of variations of pressure.

4. In a plant for heating and distributing hot tap-water, in combination, a heater for hot water, at least one main for hot water from said heater, branch pipes from said main to at least one tapping station, valves in said branch pipes, a regulator in each of said mains giving a substantially constant quantity of water per unit of time substantially independent of variations of the pressure in the conduit before and behind said regulator.

5. In a plant for heating and distributing hot tap-water, in combination, a heater for hot water, at least one main for hot water from said heater, branch pipes from said main to at least one tapping station, valves in said branch pipes, a housing in each of said mains, a spindle secured in said housing, a throttle disc movable longitudinally on said spindle in the direction of flow, and reversely, fixed carriers for said spindle, a helical spring encircling said spindle between said disc and one of said carriers, a sleeve secured to said disc and enclosing at least that part of said spring which is in the narrowest cross-section of said housing, which has a longitudinal passage with a circular cross-section decreasing from both ends to the centre along said spindle in such manner that a substantially constant quantity of tap-water flows therethrough independent of variations of the pressure of the water supplied to said heater and of the number of valves simultaneously opened for tapping.

6. In a system for supplying hot water for tapping purposes, in combination, a hot water heater, a conduit from said heater to a tapping station, and a regulator in said conduit actuated exclusively by the pressure of the water flowing through said regulator and by an internal force in said regulator to give a substantially constant quantity of water per unit of time substantially independent of variations of the pressure of said water.

ERIK TORVALD LINDEROTH.